(12) United States Patent
Kinoshita et al.

(10) Patent No.: US 7,788,318 B2
(45) Date of Patent: Aug. 31, 2010

(54) PRINTING MANAGEMENT SYSTEM AND ELECTRONIC FILE PRINTING METHOD

(75) Inventors: Koji Kinoshita, Tokyo (JP); Akio Hiraoka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1292 days.

(21) Appl. No.: 10/682,122

(22) Filed: Oct. 10, 2003

(65) Prior Publication Data

US 2004/0133636 A1 Jul. 8, 2004

(30) Foreign Application Priority Data

Oct. 15, 2002 (JP) .............................. 2002-300523

(51) Int. Cl.
*G06F 15/16* (2006.01)
(52) U.S. Cl. ....................... 709/203; 358/402; 358/1.15
(58) Field of Classification Search ................. 709/203; 358/1.15
See application file for complete search history.

(56) References Cited

U.S. PATENT DOCUMENTS

| | | | |
|---|---|---|---|
| 6,580,490 B1* | 6/2003 | Wong et al. ..................... 355/40 |
| 7,075,668 B2* | 7/2006 | Parry .......................... 358/1.14 |
| 7,123,376 B2* | 10/2006 | Shea .......................... 358/1.15 |
| 2002/0004800 A1* | 1/2002 | Kikuta et al. ............... 707/500 |
| 2002/0023959 A1* | 2/2002 | Miller et al. ........... 235/462.13 |
| 2003/0078965 A1* | 4/2003 | Cocotis et al. .............. 709/203 |

FOREIGN PATENT DOCUMENTS

| | | |
|---|---|---|
| JP | 6-337796 | 12/1994 |
| JP | 8-190489 | 7/1996 |
| JP | 2001-142964 | 5/2001 |
| JP | 2002-116898 | 4/2002 |
| JP | 2002-116981 | 4/2002 |
| JP | 2005-250873 | 9/2005 |

\* cited by examiner

*Primary Examiner*—Tonia L Dollinger
*Assistant Examiner*—Kyung H Shin
(74) *Attorney, Agent, or Firm*—Oblon, Spivak, McClelland, Maier & Neustadt, L.L.P.

(57) ABSTRACT

A user sends a printing request of a cost estimate to an electronic file management server, applying a user terminal. The electronic file management server that received the printing request, generates printing data of the cost estimate. Next, the electronic file management server allots URL to the generated printing data, and stores the printing data, and URL in a document data storing unit. Then, the electronic file management server generates a two-dimension bar code including the URL, allotted to the printing data, and the data concerning the printing condition, and sends it to the user terminal. Then, a printing apparatus obtains via a bar code reader, the read data of the two-dimension bar code output to a display unit, obtains printing data from the electronic file management server, applying the URL extracted from the two-dimension bar code, and performs printing.

9 Claims, 6 Drawing Sheets

PRINTING MANAGEMENT SYSTEM AND ELECTRONIC FILE PRINTING METHOD

BACKGROUND OF THE INVENTION

1. Field of the Invention

The present invention relates to an electronic file management server, and a printing apparatus and the like, for printing a digitalized file of documents, and images.

2. Description of the Related Art

These days, document files, and image files, which are digitalized documents, and images, are often used. Also, various document files and the like are provided by various servers, via a network, such as the internet. A user can browse these documents, by applying a computer terminal. When the user uses these documents, the user usually loads the digitize document file to the user's own computer terminal. Then, in a case where the user prints the document, the user sends the loaded electronic file to a printer, as printing data. The printer performs printing applying the received printing data.

A system for outputting a cost estimate at a negotiating table is disclosed in the Unexamined Japanese Patent Application KOKAI Publication No. 2001-142964. By this, a server receives data of a cost estimate condition, from a portable terminal, via a network, obtains data of cost estimate result, based on the cost estimate condition, and sends the obtained data to the portable terminal that requested the data. The portable terminal receives the data of the cost estimate result, and displays it in a display. Then, when the cost estimate result is approved, the data of the cost estimate is sent to a facsimile (the facsimile at the client's company).

However, generally, a portable terminal (for example, a mobile-phone unit, etc.,) often has a given limit of the memory capacity of data, and the size of the screen. Therefore, in many cases, it is virtually difficult to display the requested document to the display of the mobile-phone unit, and freely browse the document, and there are case where the making of printing data, and sending data to the printer, can not be carried out effectively.

SUMMARY OF THE INVENTION

In consideration of the above, the object of the present invention is to provide an electronic file management server, a printing apparatus, and an electronic file printing method, etc., for effectively performing printing of a document of an electronic file.

To achieve the above object, an electronic file management server according to a first aspect of the present invention, is an electronic file management server connected to a user terminal, and a printing apparatus, via a network, comprising:

a receiving unit, which receives a printing request of an electronic file, via the network;

an identification pattern generating unit, which generates identification patterns, including a storing place of the electronic file, based on the received printing request of the electronic file; and a sending unit, which sends back the identification pattern to the user terminal, via the network.

The identification pattern generating unit may further include in the identification pattern, information concerning a printing request of the electronic file.

The identification pattern may be a barcode.

The receiving unit may receive the printing request, by electronic mail, and the sending unit may send back an electronic mail, including information concerning the identification pattern.

An electronic file generating unit, which generates the electronic file based on the printing request, and stores the electronic file in a predetermined storing area, may be further comprised.

The information concerning the storing place of the electronic file, may be information concerning URL.

The network, may include internet.

A printing apparatus according to a second aspect of the present invention, is a printing apparatus that is connected to a document server, via a network, comprising:

a reading unit, which reads identification pattern output by a user terminal;

an electronic file obtaining unit, which obtains an electronic file from said electronic file management server, via said network, based on the read identification pattern; and a printing unit, which prints the obtained electronic file.

The electronic file obtaining unit may extract information concerning the printing condition of the electronic file, from the identification pattern, and the printing unit may perform printing, based on the extracted information, concerning the printing condition.

The identification pattern may be a barcode.

An electronic file printing method is an electronic file printing method that performs printing of an electronic file of a document, applying a user terminal, a printing apparatus, and an electronic file management server, connected via a network, comprising:

a receiving step, wherein the electronic file management server receives a printing request of an electronic file, sent by the user terminal, via the network;

a sending back step, wherein the electronic file management server generates an identification pattern, including information concerning a storing place of the electronic file, based on the received printing request of the electronic file, and sends back the identification pattern to the user terminal;

a displaying step, wherein the user terminal displays the received identification pattern;

an obtaining step, wherein the printing apparatus obtains the identification pattern from a reading apparatus that reads the identification pattern, displayed by the user terminal;

an obtaining step, wherein the printing apparatus obtains the electronic file, from the electronic file management server, via the network, based on the obtained identification pattern; and a printing step, wherein the printing apparatus performs printing of the obtained electronic file.

A recording medium according to a fourth aspect of the present invention, stores a program for a computer to execute:

a receiving step which receives a printing request of an electronic file, from a user terminal, via a network;

an identification pattern generating step, which generates an identification pattern, including information concerning a storing place of the electronic file, based on the received printing request of the electronic file; and a sending step, which sends back the identification pattern back to the user terminal, via the network.

The identification pattern may further include information concerning the printing condition of the electronic file, in the identification pattern.

The identification pattern may be a barcode.

The receiving step may receive the printing request by electronic mail, and the sending step may send back an electronic mail, including information concerning the identification pattern.

An electronic file managements step, which generates the electronic file, and stores the file in a predetermined storing area, based on the printing request received by the user terminal, may be further comprised.

Information concerning the storing place of the electronic file, may be information concerning URL.

A computer data signal according to a fifth aspect of the present invention, is a computer data signal embedded in a carrier wave, and representing a program for controlling a computer to execute:

a receiving step, which receives a printing request of an electronic file, from a user terminal, via a network;

an identification pattern generating step, which generates an identification pattern, including information concerning a storing place of the electronic file, based on the received printing request of the electronic file; and a sending step, which sends back the identification pattern to the user terminal via the network.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

The embodiment of the present invention will now be described with reference to the drawings.

Figure 1:
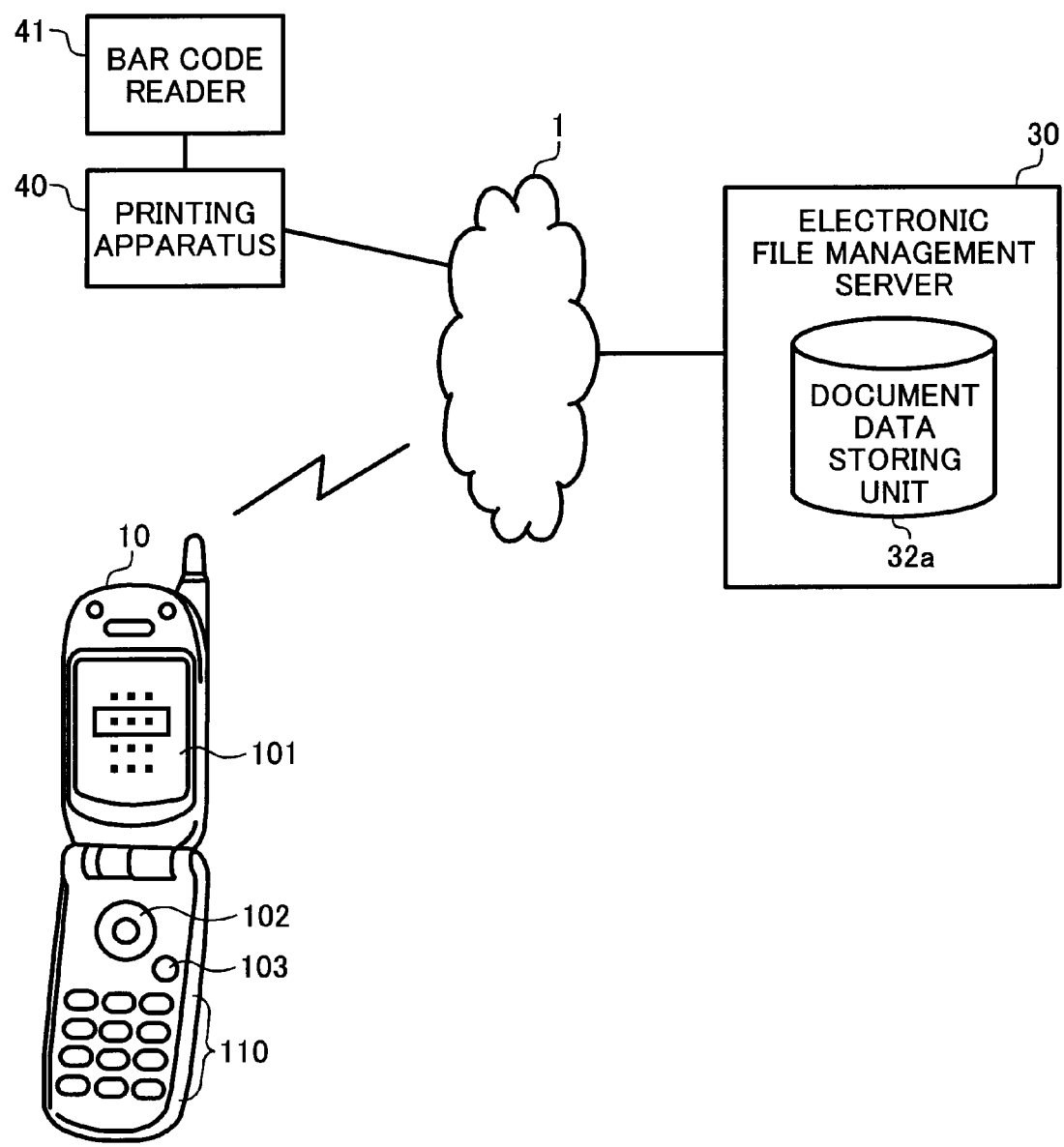
FIG. 1 is a structure diagram of a printing system that comprises an electronic file management server, and a printing apparatus, according to the embodiment of the present invention.

FIG. 1 is a structure diagram showing a printing system that comprises an electronic file management server, and a printing apparatus, according to the embodiment of the present invention. An electronic file management server 30, and a printing apparatus 40 in FIG. 1, are applied to print a requested electronic file, in a case where a user requests printing, via a network. In this embodiment, for example, it is assumed that a printing of an electronic file of a digitalized cost estimate is performed.

To perform printing in this printing system, as shown in FIG. 1, a user terminal 10, which is connectable to a network 1, such as the internet, is applied. In this embodiment, it is assumed that for example, a mobile-phone unit is used as the user terminal 10.

Figure 2:
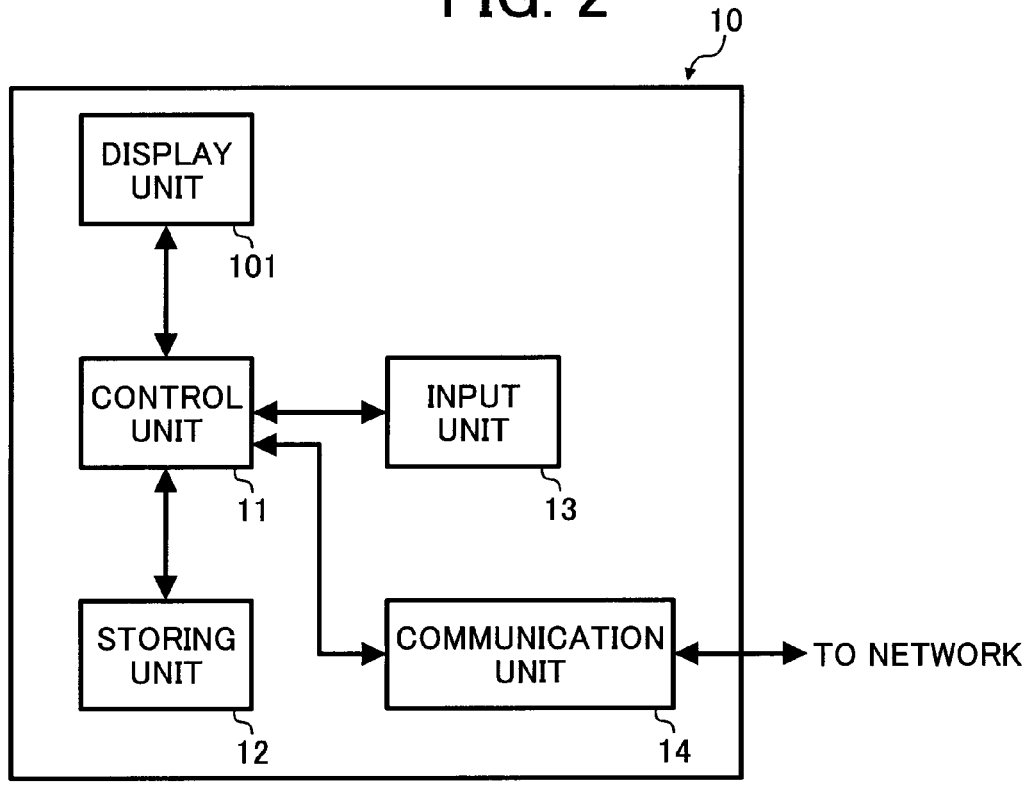
FIG. 2 is a diagram showing an example of a structure of a user terminal.

As shown in FIG. 2, the user terminal 10 comprises, a control unit (CPU) 11, a storing unit 12 (RAM, ROM, etc.), a display unit 101, an input unit 13, a communication unit 14, and etc. The control unit 11 realizes normal telephone functions, data processing functions, and data communication functions, and etc., by reading various programs and the like, stored in the storing unit 12, and performing them. The storing unit 12 stores various programs (including a cost estimate generating program that will be later described), and data, for realizing each function of the above. The input unit 13 includes various buttons that will be later described, and gives the input data to the control unit 11. The display unit 101 displays various data under the control of the control unit 11. The communication unit 14 controls communication with other devices via the network 1.

As shown in FIG. 1, the user terminal 10 comprises the display unit 101, a dial number button 110, a selection button 102, and a mode-switch button 103, on the outer surface of the user terminal 10. The mode-switch button 103 is depressed to switch from a normal telephone mode to a data communication mode. In response to this operation, the control unit 111 displays data that the user terminal 10 received, and a pointer, in the display unit 101. The selection button 102 comprises a direction indicating function (pointer moving function), and a clicking function. By carrying out a direction indication applying the selection button 102, the pointer displayed in the display unit 101 can be moved, and by depressing (clicking) the selection button 102, an item that the pointer indicates can be selected in a display screen.

Figure 3:
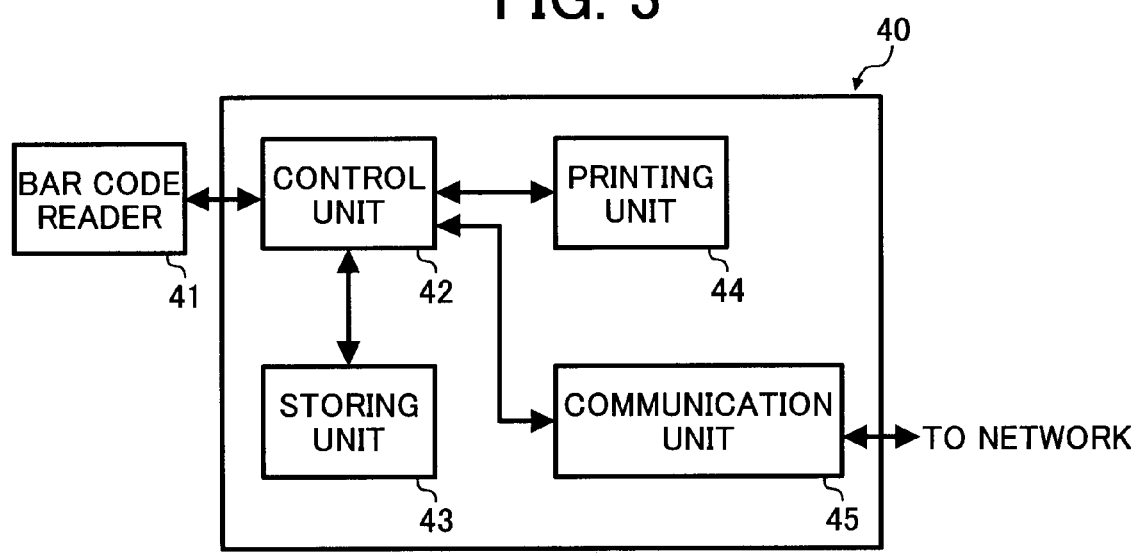
FIG. 3 is a diagram showing an example of a structure of a printing apparatus.

As shown in FIG. 1, the electronic file management server 30, and the printing apparatus 40 are respectively connected to network 1, such as the internet, etc. In this embodiment, a document that the user requests is printed by the printing apparatus 40. The printing apparatus 40 includes for example, a printer, etc., and as shown in FIG. 3, comprises a control unit (CPU) 42, a storing unit 43, a printing unit 44, and a communication unit 45, and a reading device, such as a bar-code reader 41, etc., which is connected to the printing apparatus 40. The control unit 42 performs printing processing, processing of receiving and sending data, which will be later described, and etc., by reading various programs stored in the storing unit 43, and executing the programs. The storing unit 43 stores various programs performed by the control unit 42, and data, etc. necessary for processing. The printing unit 44 prints data on a sheet, under the control of the control unit 42. The communication unit 45 controls communication with other devices via the network 1. Additionally, the bar-code reader 41 functions as a reading unit that reads an identification pattern, such as a two-dimension bar-code and the like.

Figure 4:
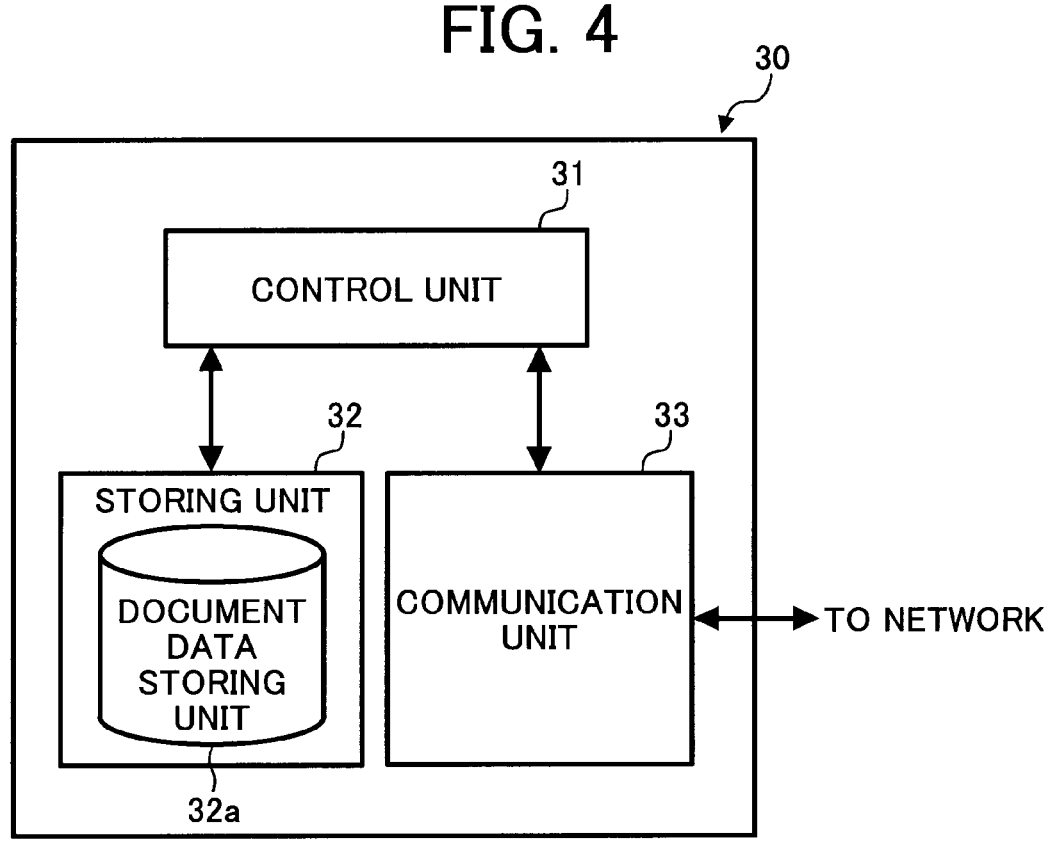
FIG. 4 is a diagram showing an example of a structure of an electronic file management server.
Figure 5:
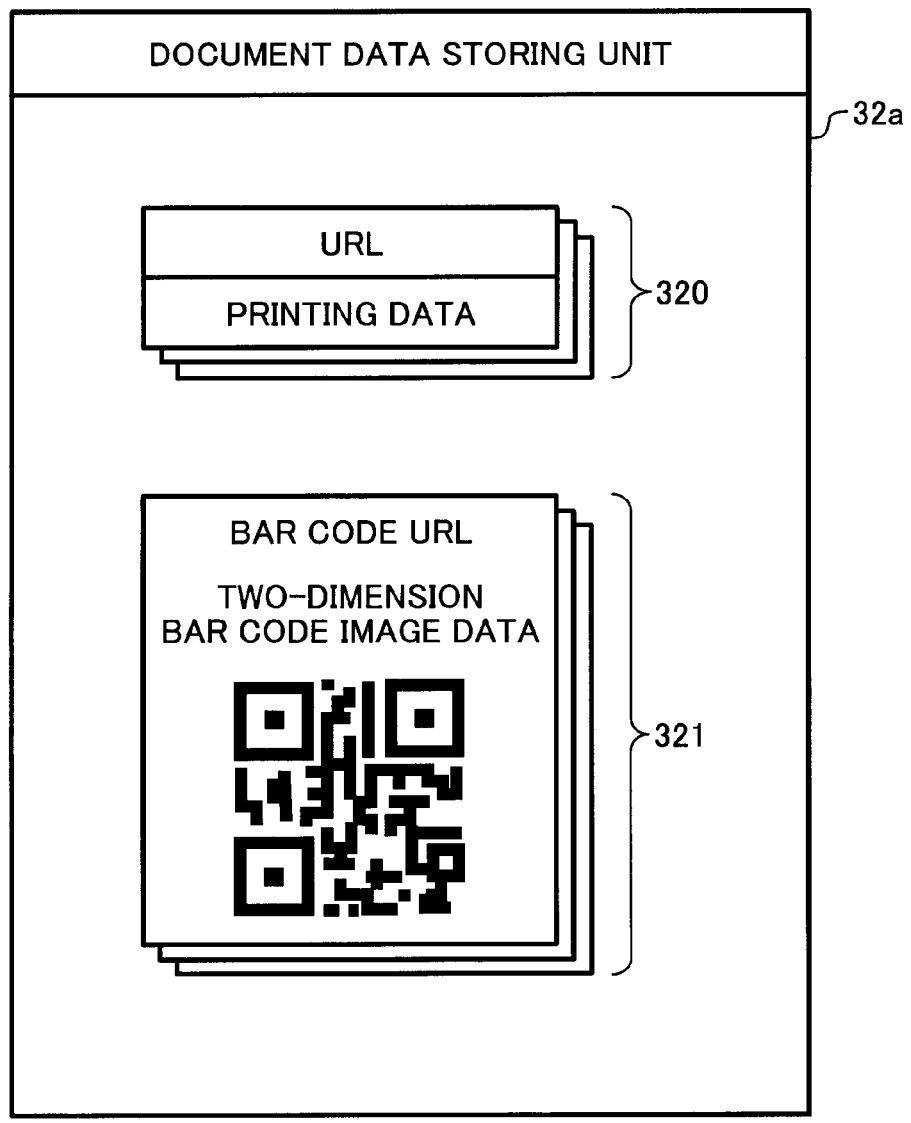
FIG. 5 is a diagram for describing data stored in a document data storing unit.

The electronic file management server 30 is a computer system that stores, and manages, electronic files of the documents (cost estimates) that are printed, and for example, as shown in FIG. 4, the electronic file management server 30, comprises a control unit 31, a storing unit 32, and a communication unit 33. The control unit 31 logically realizes, a receiving unit which receives a printing request of an electronic file from the user terminal 10, an identification pattern generating unit which generates an identification pattern, including information concerning the storing place of the electronic file, a sending unit which sends the identification pattern back to the user terminal 10, and an electronic file generating unit which generates an electronic file of a cost estimate based on the printing request from the user terminal 10, and stores the electronic file in a predetermined storing area, etc., by reading various programs stored in the storing unit 32, and performing the various programs. The storing unit 32 stores the various programs (including the printing management program), performed by the control unit 31, and data necessary for processing. Additionally, the storing unit 32 comprises a document data storing unit 32a. As shown in FIG. 5, document data 320 concerning documents (in this embodiment, cost estimates), and two-dimension bar code data 321 such as image data of a two-dimension bar-code, are stored in the document data storing unit 32a.

The document data 320 is generated, and stored in a case where the user carries out the printing request of the cost estimate, applying the user terminal. The document data 320 includes information indicating the storing place of the electronic file (printing data) of the document, which is the printing target, and printing data, and these information are stored in the document data storing unit 32a, being respectively associated according to each document that is printed. The information indicating the storing place of the electronic file, is for example a URL (Uniform Resource Locator) and the like. By applying the URL and the like, the document file (printing data) which is the printing target, is specified, and can be obtained. Additionally, the printing data is data for the printing apparatus to perform printing, and in this embodiment, the printing data is data of the electronic file of the cost estimate.

The two-dimension bar code data 321 is generated, and stored when the printing data of the document data 320 is generated. The two-dimension bar code data 321 includes a two-dimension bar code (identification pattern), and information concerning the storing place of the two-dimension bar code (information concerning the identification pattern), and these information are stored in the document data storing unit 32a, being respectively associated. Information specifying the storing place of the two-dimension bar code, is for example, a URL (URL for barcodes) and the like. Applying the URL included in the two-dimension bar code, the location of the printing data of the document data can be specified.

Figure 6:
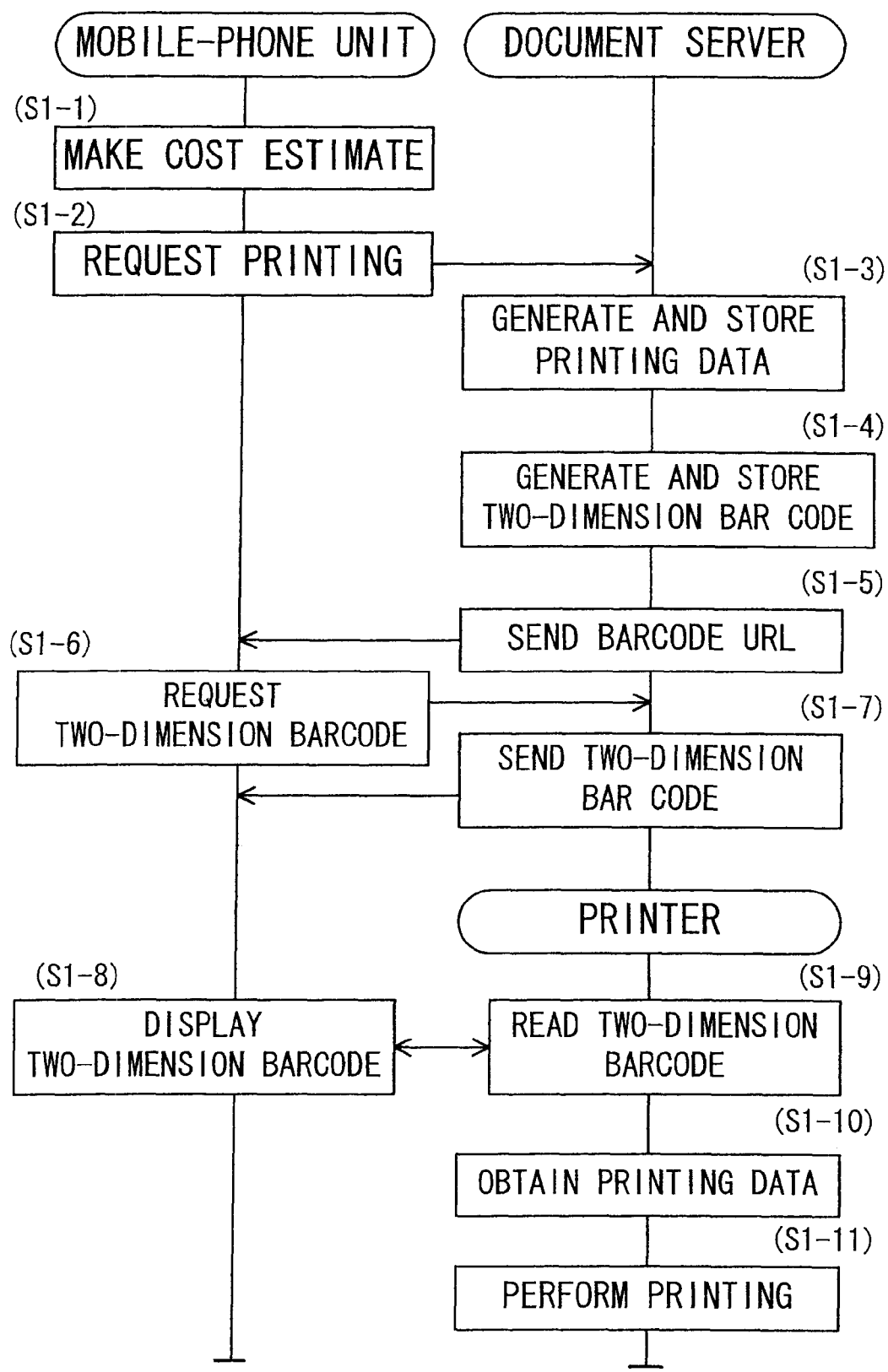
FIG. 6 is a diagram for describing the flow of processing, in a case where printing is performed in the printing system of FIG. 1.

Next, a processing wherein the user prints the requested cost estimate, in the system of the above structure, will be described with reference to FIG. 6. Here, it will be described by dividing the steps, to a requesting step, where the user requests printing, and a printing step, where printing is performed.

(Requesting Step)

Figure 7:
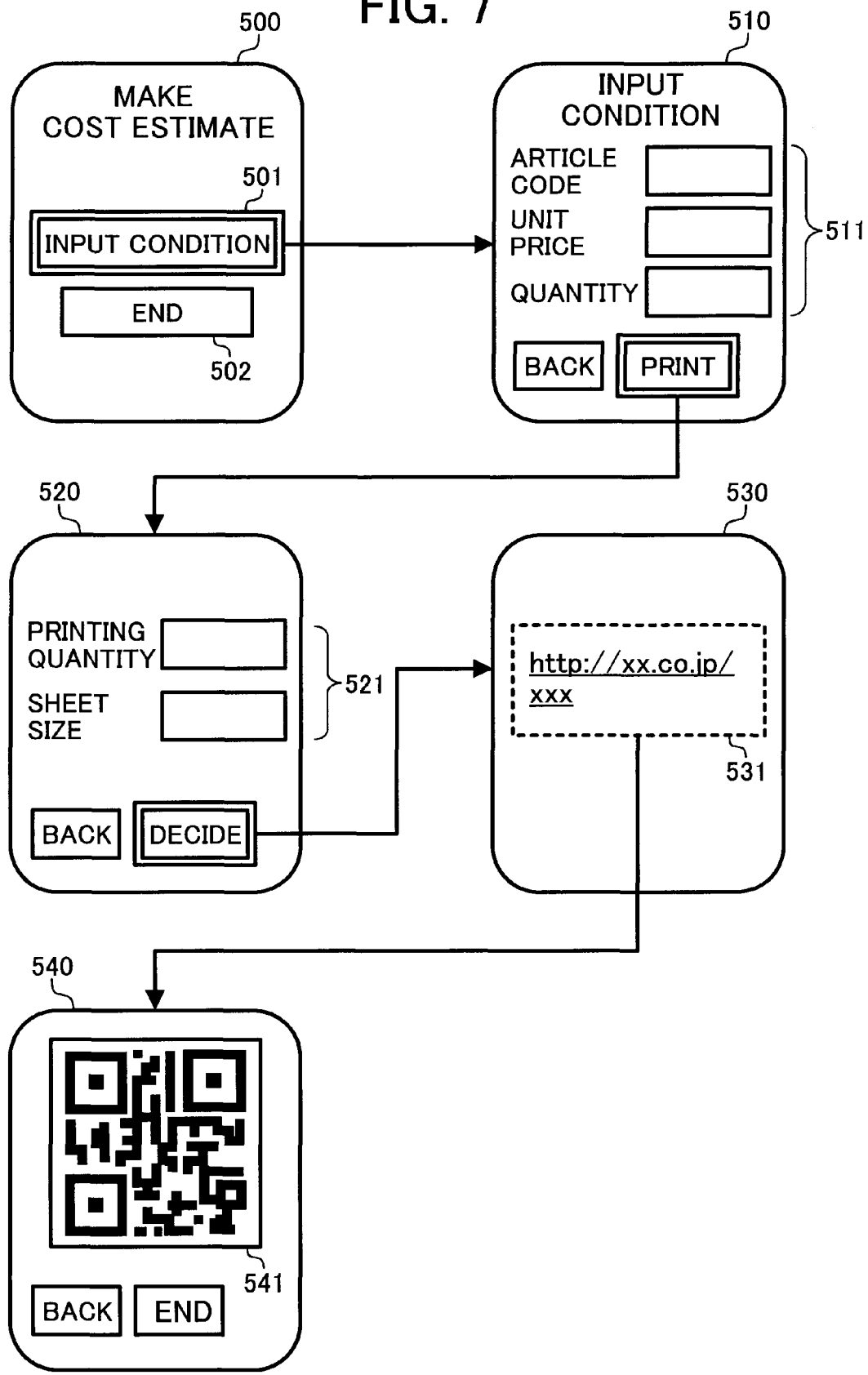
FIG. 7 is a diagram, showing an example of a screen output by a display unit of the user terminal.

First, a processing of a requesting step, wherein the user requests printing, will be described. The user makes a cost estimate, operating the user terminal 10 (S1-1). In this case, according to a predetermined input operation by the user, the control unit 11 of the user terminal 10 activates a cost estimate making program, stored in the storing unit, and starts a cost estimate making process. In this cost estimate making process, a display screen 500, shown in FIG. 7 is output to the display unit 101 of the user terminal 10. The display screen includes a condition input button 501, and an end button 502. The condition input button 501 is applied, in a case where a cost estimate condition for making a cost estimate, is set. In a case where the end button 502 is selected, the user terminal 10 ends the cost estimate making process.

For example, when the user selects the condition input button 501 by moving the pointer, displayed in the displaying unit, by operating the selection button 102, the user terminal 10 outputs a display screen 510, such as shown in FIG. 7. The display screen 520 includes a cost estimate condition input space 511.

The cost estimate condition input space 511 is an input space for setting data, concerning the cost estimate condition, such as article code, unit price, and quantity, etc., for making the cost estimate. The dial number button 110 is applied for inputting data to the cost estimate condition input space 511. In a case where the input to the cost estimate condition input space 511 is completed, the user selects the printing button, by operating the selection button 102, so that the pointer displayed in the displaying unit 101, moves. In accordance with this, the user terminal 10 outputs a screen 520, such as shown in FIG. 7, to the displaying unit 101. The display screen includes a printing condition input space 521. The printing condition input space 521 is an input space for setting data, concerning the printing condition, such as printing quantity, and sheet size. The dial number button 110 is applied for inputting data to the printing condition input space 521. In a case where the input to the printing condition input space 521 is completed, the user selects the decide button, by operating the selection button 102, so that the pointer displayed in the displaying unit 101, moves. In accordance with this, the user terminal 10 sends the printing request data to the electronic file management server 30 via the network 1 (S1-2). This printing request data includes data concerning the cost estimate condition and the printing condition set, using the display screens 510 and 520.

The electronic file management server 30 receives the printing request data from the user terminal 10, and generates printing data (S1-3). Concretely, the electronic file management server 30 carries out a processing of making the cost estimate, based on the cost estimate condition that the received data shows, and generates the printing data, which is the electronic file of the made cost estimate.

Then, the electronic file management server 30 stores the generated printing data in the document data storing unit 32a. In this regard, the electronic file management server 30 allots a URL to the generated printing data, and stores the printing data, and the URL as document data 320, in the document data storing unit 32a.

Next, the electronic file management server 30 generates an identification pattern (in this embodiment, a two-dimension bar code), which includes the URL allotted to the printing data, and data concerning the printing condition, received by the user terminal 10 (S1-4). Then, the electronic file management server 30 allots a URL (URL for barcodes) to the two-dimension bar code, and stores the two-dimension bar code and the barcode URL, as the barcode URL data 321, to the document data storing unit 32a.

Then, the electronic file management server 30 sends an electronic mail, which includes the barcode URL, to the user terminal 10 (S1-5). The user terminal 10 that receives the electronic mail, outputs a display screen 530, such as shown in FIG. 7. This display screen 530 includes a display of barcode URL 531, used to obtain two-dimension bar code images.

(Printing Step)

Next, a processing of a printing step, wherein the printing of the printing data is performed, will be described. First, the user terminal 10 requests for the two-dimension bar code image, to the electronic file management server (S1-6). Concretely, in accordance with the user selecting the display of barcode URL 531, displayed in the screen 530 of the displaying unit 101 of the user terminal 10, the user terminal 10 sends the request for the two-dimension image, which is stored in the selected URL, via the network 1.

The electronic file management sever 30 that received the request from the user terminal 10, specifies the requested two-dimension bar code, stored in the document data storing unit 32a. Then, the electronic file management server 30 reads the specified two-dimension bar code image, and sends it to the user terminal 10, via the network 1.

The user terminal 10 receives the two-dimension bar code image (identification pattern) from the electronic file management server 30, and outputs a display screen 540, such as shown in FIG. 7 (S1-8). The display screen 540 includes a two-dimension bar code image 541.

The user makes a bar code reader 41, connected to the printing apparatus 40, read the two-dimension bar code image 541, output to the display unit 101 of the user terminal 10. The bar code reader 41 reads the two-dimension bar code image 541, and provides the read data to the printing apparatus 40. The printing apparatus 40 carries out decode of the data of the two-dimension bar code, obtained via the bar code reader, and extracts information such as URL, printing condition, and the like.

Next, the printing apparatus 40 obtains the printing data from the electronic file management server 30 (S1-10). Concretely, the printing apparatus 40 access to the electronic file management server 30, via the network 1, applying the URL extracted by the two-dimension bar code image 541, and requests the printing data that is stored in the storing place, indicated by the URL. In accordance with this, the electronic file management server 30 reads the requested printing data from the document data storing unit 32a, and sends it to the printing apparatus 40. The printing apparatus 40 receives the printing data from the electronic file management server 30.

Then, the printing apparatus 40 performs the printing process of the printing data (S1-11). Concretely, the printing apparatus 40 performs printing, applying the printing condition, extracted from the two-dimension bar code image 541, and the printing data, obtained from the electronic file management server 30. By this, the printing of printing data is completed.

According to the present invention, effects of below, can be obtained.

In the above embodiment, the electronic file management server 30 that receives the printing request, generates the printing data, allots URL to the printing data, and stores the printing data, and URL as the document data 320, in the storing unit 32. Consequently, printing data can be obtained via the network 1, such as the internet, etc., by specifying the URL. Therefore, the printing of documents can be performed, by applying a relatively simple terminal, such as the user terminal 10, and the like. Furthermore, documents that are printed, can also be obtained even when the user is out.

In the above embodiment, the electronic file management server 30 generates two-dimension bar codes including the URL allotted to the printing data, and data concerning the printing condition. Then, the electronic file management server 30 sends the generated two-dimension bar code to the user terminal 10, via the network 1, such as the internet, and the like. The user terminal 10 displays the received two-dimension bar code image 541, on the displaying unit 101. By making the bar code reader 41, connected to the printing apparatus 40, read the two-dimension bar code image 541, which is displayed in the user terminal 10, the URL of the printing data, and the printing condition can easily be provided to the printing apparatus 40.

In the above embodiment, the two-dimension barcode data 321 is stored in the document data storing unit 32a. The two-dimension bar code 321 includes two-dimension bar code image, and bar code URL, which is associated with each other. The electronic file management server 30 sends the electronic mail including this bar code URL to the user terminal 10. The user terminal 10 obtains the two-dimension bar code image 541 by applying the display of barcode URL 531, displayed in the displaying unit 101. By this, the identification pattern (two-dimension bar code in this embodiment), can be provided the user terminal, applying the URL.

In the above embodiment, the printing apparatus 40 obtains the printing data from the electronic file management server 30. Then, the printing apparatus 40 performs printing, applying the printing condition extracted from the two-dimension bar code image 541, and the printing data obtained from the electronic file management server 30. By this, because the printing data does not have to be loaded to the user terminal 10, the printed document can easily be obtained, even in a case where a user terminal with a relatively small storing capacity, is applied.

The above embodiment may be modified as below.

In the above embodiment, it is assumed that the electronic file of the cost estimate, is the electronic file, which is the printing target, but the content of the electronic file is not limited to this, and electronic files concerning various documents, and images are applicable. For example, document data 320 concerning the electronic file of lecture documents, documents for presentations, and various forms, and the two-dimension data 321 may be stored in the storing unit 32, and by performing the same process as above, necessary documents can be printed.

In the above embodiment, the electronic file management server 30 receives the printing request data, and generates the printing data. Concretely, the electronic file management server 30 makes the cost estimate, based on the cost estimate condition, and generates printing data to print the cost estimate. Then, a URL is allotted to the generated printing data, and the electronic file management server 30 stores the printing data, and the URL to the document data storing unit 32a, as the document data 320. However, it is not limited to this, and the document file that becomes the printing data, may be a web page provided by various sites on the internet. In this case, the electronic file management server 30 generates the two-dimension bar code image, including the URL for specifying the web page, and data concerning the printing condition, and stores it in the document data storing unit 32a. Then, the printing apparatus 40 directly accesses to the various sites, shown by the URL, extracted from the two-dimension bar code, and obtains the document file. By this, various document files, such as a web page, can be printed.

In the above embodiment, the electronic file management server 30 generates the two-dimension bar code that includes URL, and data concerning the printing condition, and provides it to the user terminal 10. A one-dimension bar code, or other patterns may be applied instead of the two-dimension bar code, if it can provide information through the displaying unit 101 of the user terminal 10.

In the above embodiment, the electronic file management server 30 generates the two-dimension bar code that includes URL, and data concerning the printing condition. The two-dimension bar code is displayed in the displaying unit 101 of the user terminal 10. The printing apparatus 40 extracts the printing condition from the two-dimension bar code image, read by applying the bar code reader 41. This can be changed, so that the data of the printing condition is not included in the two-dimension bar code, and that the printing condition and the URL are respectively associated, and stored in the document data storing unit 32a. Then, the printing apparatus 40 accesses to the electronic file management server 30, applying the URL, extracted by the two-dimension bar code, and in accordance with this, the electronic file management server 30 sends the data of the printing condition to the printing apparatus 40. Then, the printing apparatus 40 performs printing, based on the data of printing condition, received from the electronic file management server 30. By this, information amount included in the identification pattern, such as the two-dimension bar code, etc., can be reduced.

In the above embodiment, printing is requested to the electronic file management server 30, by applying the cost estimate making program, stored in the user terminal 10, but this can be changed, so that printing may be requested to the electronic file management server 30, by an electronic mail. In this case, the user terminal 10 sends an electronic mail, including information of the cost estimate condition, and the printing condition, to the electronic file management server 30. The electronic file management server 30 extracts the cost estimate condition from the received electronic mail, and generates printing data based on the cost estimate condition, allots URL to the printing data, and stores the printing data, and the URL to the document data storing unit 32*a*, as the document data 320. Then, the electronic file management server 30 sends a return mail, with the two-dimension bar code, including the URL and the data concerning the printing condition, attached to the user terminal 10. By this, printing can be performed easier, by applying electronic mail.

In the above embodiment, in the display screen 520, data of the printing quantity, and sheet size, etc, are input as the printing condition, but input items are not limited to these, and other items may by input as the printing condition. For example, a selection of black and white printing/color printing, a quantity of pages N, which is the number of pages, in a case of n-up printing, where multiple pages are placed on one page (for example, "2" in a case of 2-up printing), and a reduction ratio (for example, "80%", etc.) may be input. In this case, these information are included in the two-dimension bar code. By this, the user can perform printing of various patterns.

The printing apparatus 40 is not limited to a printer, and for example, a facsimile terminal, a copying machine that comprises a network function, or a complex machine that comprises functions of a printer, facsimile, and a copying machine, may be applied.

In the above embodiment, the user terminal 10 is applied as the user terminal, but it is not limited to this, and for example, a personal computer, or a PDA (Personal Digital Assistant) may be applied. By applying a user terminal that can receive an electronic mail of for example an HTML (Hyper Text Markup Language), the two-dimension bar code image can be directly provided to the user terminal, applying electronic mail. In this case, because the two-dimension bar code data 321, and the steps (S1-5) to (S1-7) in the flow chart of FIG. 6, are not necessary, the two-dimension bar code can be provided easier. Additionally, in this case, a step which sends the two-dimension bar code, is provided in FIG. 6, instead of the steps (S1-5) to (S1-7).

The network 1 that connects the user terminal 10, and the electronic file management server 30, and the printing apparatus 40, is not limited to the internet, and each device may be connected by applying other networks, such as LAN, WAN, and etc. For example, by applying a LAN in a company, the user can perform printing without loading the document file to the user's own terminal, and the like.

As described above, according to the present invention, printing of the requested electronic file can be performed easily, and effectively, applying the user terminal.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-300523 filed on Oct. 15, 2002, and including specification, claims, drawings and summary. The disclosure of the above Japanese Patent Application is incorporated herein by reference in its entirety.

What is claimed is:

1. A printing management system comprising a printing management server which is connectable to a user terminal via a network and a printing apparatus which is connectable to a document server via a network,
   wherein the printing management server includes:
      a receiving unit, which receives a printing request of an electronic file, via said network;
      an identification pattern generating unit, which generates an identification pattern including both
         information concerning a storing place of the electronic file and
         information concerning a printing condition of the electronic file,
      the identification pattern generated based on the received printing request of the electronic file,
      the printing condition including at least one of
         a sheet size,
         a printing quantity,
         a black and white/color printing selection,
         a reduction ratio and
         a quantity of pages N, the quantity of pages N corresponding to the number of pages to be placed on a single page in N-up printing; and
      a sending unit, which sends back said identification pattern to the user terminal, via said network, and
   the printing apparatus includes:
      a reading unit, which reads said identification pattern output by the user terminal;
      an electronic file obtaining unit, which obtains an electronic file from said electronic file management server, via said network, based on the read identification pattern and extracts information concerning the printing condition of the electronic file from said identification pattern; and
      a printing unit, which prints the obtained electronic file based on the extracted information concerning the printing condition.

2. The printing management system according to claim 1, wherein said identification pattern is a barcode.

3. The printing management system according to claim 1, wherein said receiving unit receives the printing request, by electronic mail, and said sending unit sends back an electronic mail, including information concerning the identification pattern.

4. The printing management system according to claim 1 that further comprises an electronic file generating unit, which generates said electronic file based on the printing request, and stores the electronic file in a predetermined storing area.

5. The printing management system according to claim 1, wherein the information concerning the storing place of said electronic file, is information concerning URL.

6. The printing management system according to claim 1, wherein said network, includes internet.

7. The printing management system of claim 1, wherein the printing condition includes the quantity of pages N, the quantity of pages N corresponding to the number of pages to be placed on the single page in N-up printing.

8. An electronic file printing method that performs printing of an electronic file of a document, using a user terminal, a printing apparatus, and an electronic file management server, connected via a network, comprising:
   a receiving step, wherein the electronic file management server receives a printing request of an electronic file, sent by said user terminal, via said network;

a sending back step, wherein said electronic file management server generates an identification pattern including both
  information concerning a storing place of the electronic file and
  information concerning a printing condition of the electronic file,
the identification pattern generated based on the received printing request of the electronic file, and sends back the identification pattern to said user terminal,
the printing condition including at least one of
  a sheet size,
  a printing quantity,
  a black and white/color printing selection,
  a reduction ratio and
  a quantity of pages N, the quantity of pages N corresponding to the number of pages to be placed on a single page in N-up printing;
a displaying step, wherein said user terminal displays the received identification pattern;
an obtaining step, wherein said printing apparatus obtains the identification pattern from a reading apparatus that reads the identification pattern, displayed by said user terminal;
an obtaining step, wherein said printing apparatus obtains the electronic file, from said electronic file management server, via said network, based on the obtained identification pattern and extracts information concerning the printing condition of the electronic file from said identification pattern; and
a printing step, wherein said printing apparatus performs printing of the obtained electronic file based on the extracted information concerning the printing condition.

9. A printing management system comprising a printing management server which is connectable to a user terminal via a network and a printing apparatus which is connectable to a document server via a network,
  wherein the printing management server includes:
    a receiving unit, which receives a printing request of an electronic file, via said network;
    an identification pattern generating unit, which generates an identification pattern including both
      information concerning a storing place of the electronic file and
      information concerning a storing place of a printing condition of the electronic file,
    the identification pattern generated based on the received printing request of the electronic file; and
    a sending unit, which sends back said identification pattern to the user terminal, via said network, and
  the printing apparatus includes:
    a reading unit, which reads said identification pattern output by the user terminal;
    an electronic file obtaining unit, which obtains an electronic file and information concerning a printing condition of the electronic file from said document server, via said network, based on the read identification pattern and extracts information concerning the printing condition of the electronic file from said identification pattern; and
    a printing unit, which prints the obtained electronic file based on the obtained information concerning the printing condition.

* * * * *